(12) United States Patent
Vizzini et al.

(10) Patent No.: US 9,416,202 B2
(45) Date of Patent: *Aug. 16, 2016

(54) ZIEGLER-NATTA CATALYST SYSTEMS AND POLYMERS FORMED THEREFROM

(75) Inventors: Kayo Vizzini, Pasadena, TX (US); David Knoeppel, League City, TX (US); Lei Zhang, Seabrook, TX (US)

(73) Assignee: TINA TECHNOLOGY, INC., Houston, TX (US)

( * ) Notice: Subject to any disclaimer, the term of this patent is extended or adjusted under 35 U.S.C. 154(b) by 813 days.

This patent is subject to a terminal disclaimer.

(21) Appl. No.: 13/316,662

(22) Filed: Dec. 12, 2011

(65) Prior Publication Data

US 2012/0083405 A1 Apr. 5, 2012

Related U.S. Application Data

(63) Continuation of application No. 12/685,198, filed on Jan. 11, 2010, now Pat. No. 8,592,535.

(51) Int. Cl.
*B01J 31/00* (2006.01)
*B01J 37/00* (2006.01)
*C08F 4/44* (2006.01)
(Continued)

(52) U.S. Cl.
CPC ............... *C08F 10/00* (2013.01); *C08F 110/02* (2013.01)

(58) Field of Classification Search
CPC .............. C08F 4/44; C08F 4/06; B01J 31/00; B01J 37/00
USPC ........ 502/104, 132; 526/119, 125.1, 154, 186
See application file for complete search history.

(56) References Cited

U.S. PATENT DOCUMENTS 4,271,060 A 6/1981 Hubby
4,543,399 A 9/1985 Jenkins, III et al.
(Continued)

FOREIGN PATENT DOCUMENTS

CN 1856363 A 11/2006
GB 1306001 A 2/1973
(Continued)

OTHER PUBLICATIONS

Office Action issued in Taiwanese Patent Application No. 100100069 dated Dec. 22, 2014 and English ranslation thereof (16 pages).
(Continued)

*Primary Examiner* — Alexa Neckel
*Assistant Examiner* — Elizabeth Eng
(74) *Attorney, Agent, or Firm* — Albert Shung

(57) ABSTRACT

Processes of forming catalyst systems, catalyst systems and polymers formed therefrom are described herein. The processes generally include providing a first compound including a magnesium dialkoxide, contacting the first compound with a second compound to form a solution of reaction product "A", wherein the second compound is generally represented by the formula:

$Ti(OR^1)_4$;

wherein $R^1$ is selected from $C_1$ to $C_{10}$ linear to branched alkyls, contacting the solution of reaction product "A" with a first metal halide to form a solid reaction product "B", contacting solid reaction product "B" with a second metal halide, to form reaction product "C" and contacting reaction product "C" with reducing agent to form a catalyst component.

11 Claims, 2 Drawing Sheets

(51) Int. Cl.
*C08F 4/06* (2006.01)
*C08F 4/52* (2006.01)
*C08F 10/00* (2006.01)
*C08F 110/02* (2006.01)

(56) References Cited

U.S. PATENT DOCUMENTS

| | | | |
|---|---|---|---|
| 4,588,790 A | 5/1986 | Jenkins, III et al. |
| 5,001,205 A | 3/1991 | Hoel |
| 5,028,670 A | 7/1991 | Chinh et al. |
| 5,236,998 A | 8/1993 | Lundeen et al. |
| 5,317,036 A | 5/1994 | Brady, III et al. |
| 5,352,749 A | 10/1994 | DeChellis et al. |
| 5,405,922 A | 4/1995 | DeChellis et al. |
| 5,436,304 A | 7/1995 | Griffin et al. |
| 5,456,471 A | 10/1995 | MacDonald |
| 5,462,999 A | 10/1995 | Griffin et al. |
| 5,525,678 A | 6/1996 | Mink et al. |
| 5,589,555 A | 12/1996 | Zboril et al. |
| 5,616,661 A | 4/1997 | Eisinger et al. |
| 5,627,242 A | 5/1997 | Jacobsen et al. |
| 5,665,818 A | 9/1997 | Tilston et al. |
| 5,668,228 A | 9/1997 | Chinh et al. |
| 5,677,375 A | 10/1997 | Rifi et al. |
| 5,945,366 A | 8/1999 | Kataoka et al. |
| 6,147,173 A | 11/2000 | Holtcamp |
| 6,174,971 B1 | 1/2001 | Chen et al. |
| 6,180,735 B1 | 1/2001 | Wenzel |
| 6,207,606 B1 | 3/2001 | Lue et al. |
| 6,211,105 B1 | 4/2001 | Holtcamp |
| 6,242,545 B1 | 6/2001 | Jejelowo et al. |
| 6,245,705 B1 | 6/2001 | Kissin |
| 6,245,868 B1 | 6/2001 | Agapiou et al. |
| 6,248,845 B1 | 6/2001 | Loveday et al. |
| 6,271,323 B1 | 8/2001 | Loveday et al. |
| 6,274,684 B1 | 8/2001 | Loveday et al. |
| 6,300,436 B1 | 10/2001 | Agapiou et al. |
| 6,339,134 B1 | 1/2002 | Crowther et al. |
| 6,340,730 B1 | 1/2002 | Murray et al. |
| 6,346,586 B1 | 2/2002 | Agapiou et al. |
| 6,359,072 B1 | 3/2002 | Whaley |
| 6,380,328 B1 | 4/2002 | McConville et al. |
| 6,399,837 B1 | 6/2002 | Wilson et al. |
| 6,420,580 B1 | 7/2002 | Holtcamp et al. |
| 6,734,134 B1 | 5/2004 | Gray et al. |
| 2007/0299224 A1* | 12/2007 | Vizzini et al. .................. 526/176 |
| 2009/0203856 A1* | 8/2009 | Vizzini ................... C08F 10/02 526/119 |
| 2011/0263802 A1* | 10/2011 | Zhang et al. ............... 526/124.2 |

FOREIGN PATENT DOCUMENTS

| | | |
|---|---|---|
| JP | 2-269104 A | 11/1990 |
| WO | 2007149911 A1 | 12/2007 |

OTHER PUBLICATIONS

Office Action issued in Eurasian Patent Application No. 201270682/28 dated Jun. 30, 2014 and English translation thereof (4 pages).
Office Action issued in Japanese Application No. 2012-548223 mailed May 21, 2014, and an English translation thereof (7 pages).
Office Action issued in Chinese Patent Application No. 201180005731.X dated Aug. 12, 2014 and English translation thereof (19 pages).

* cited by examiner

ZIEGLER-NATTA CATALYST SYSTEMS AND POLYMERS FORMED THEREFROM

FIELD

Embodiments of the present invention generally relate to methods of forming Ziegler-Natta type catalyst compositions.

BACKGROUND

Many processes for forming Ziegler-Natta catalyst systems utilize blends of components. Unfortunately, such blends generally are specialty chemicals having a high production cost.

Therefore, it is desirable to develop processes for forming Ziegler-Natta catalysts capable of producing polymers having similar properties to polymers produced from catalysts formed from blends, while reducing the production cost.

SUMMARY

Embodiments of the present invention include processes of forming catalyst systems. The processes generally include providing a first compound including a magnesium dialkoxide, contacting the first compound with a second compound to form a solution of reaction product "A", wherein the second compound is generally represented by the formula:

$$Ti(OR^1)_4;$$

wherein $R^1$ is selected from $C_1$ to $C_{10}$ linear to branched alkyls, contacting the solution of reaction product "A" with a first metal halide to form a solid reaction product "B", contacting solid reaction product "B" with a second metal halide to form reaction product "C" and contacting reaction product "C" with a reducing agent to form a catalyst component.

In one or more embodiments (in combination with any other embodiment), the first compound generally is represented by the formula $Mg(OEt)_2$.

In one or more embodiments (in combination with any other embodiment), the second compound is selected from titanium tetra 2-ethylhexyl alkoxide, titanium tetra n-butoxide and combinations thereof.

In one or more embodiments (in combination with any other embodiment), the first compound contacts the second compound in an equivalent of from about 0.75 to about 1.75.

In one or more embodiments (in combination with any other embodiment), the process further includes contacting the first compound with a third compound in the presence of the second compound, wherein the third compound is generally represented by the formula:

$$Al(OR^2)_3;$$

wherein $R^2$ is selected from $C_1$ to $C_{10}$ linear or branched alkyls.

In one or more embodiments (in combination with any other embodiment), the third compound comprises aluminum 2-ethylhexyl alkoxide.

In one or more embodiments (in combination with any other embodiment), the third compound contacts the first compound in an equivalent of from about 0.1 to about 0.5.

In one or more embodiments (in combination with any other embodiment), the second compound and the third compound contact one another prior to contact with the first compound.

In one or more embodiments (in combination with any other embodiment), the reducing agent is selected from an organolithium compound, an organomagnesium compound, an organoaluminum compound and combinations thereof.

In one or more embodiments (in combination with any other embodiment), the reducing agent comprises triethyl aluminum.

In one or more embodiments (in combination with any other embodiment), the metal halide comprises $TiCl_4$.

In one or more embodiments (in combination with any other embodiment), the process is utilized to form a Ziegler-Natta catalyst.

In one or more embodiments (in combination with any other embodiment), the catalyst exhibits a volume average particle size of at least about 5 microns.

In one or more embodiments in combination with any other embodiment), the catalyst exhibits a volume average particle size that is greater than a volume average particle size of the catalyst absent contact with the third compound.

One or more embodiments (in combination with any other embodiment) include a polymerization process including introducing an olefin monomer into a reaction zone, contacting the olefin monomer with the Ziegler-Natta catalyst to form a polyolefin and withdrawing the polyolefin from the reaction zone.

In one or more embodiments (in combination with any other embodiment), the polymer is polyethylene.

In one or more embodiments (in combination with any other embodiment), the catalyst system exhibits a bimodal particle size distribution.

In one or more embodiments (in combination with any other embodiment), the reaction product "A" is formed from the second compound and a first compound in a single process step.

DETAILED DESCRIPTION

Introduction and Definitions

Figure 1:
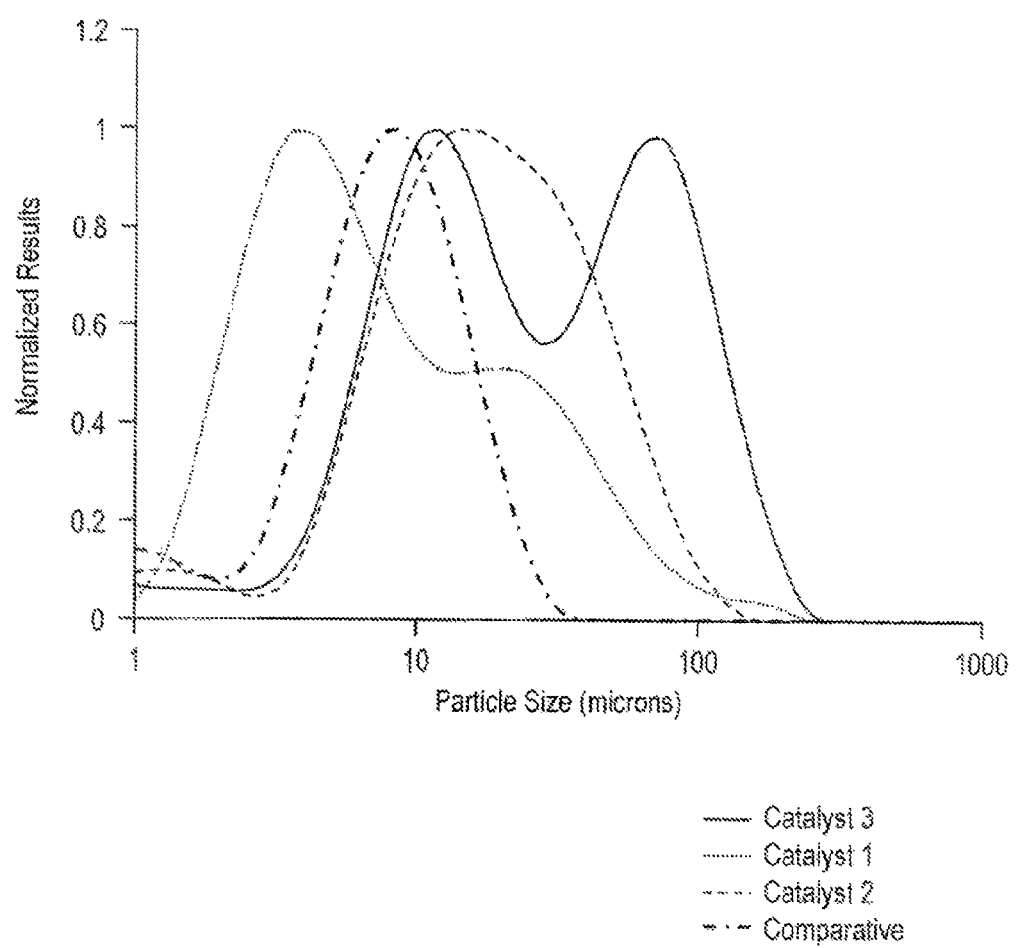
FIGS. 1 and 2 illustrate the volume average particle size distribution of formed catalysts.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

Catalyst Systems

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR^4_x;$$

wherein M is a transition metal, $R^4$ is a halogen, an alkoxy or a hydrocarboxyl group and x is the valence of the transition metal. For example, x may be from 1 to 4.

The transition metal may be selected from Groups IVB through VIB (e.g., titanium, vanadium or chromium), for example. $R^4$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEM) and TIBAl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates, or dialkoxybenzenes, for example. (See, U.S. Pat. No. 5,945,366 and U.S. Pat. No. 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPRS), for example. The external donor may be the same or different from the internal electron donor used.

The components of the Ziegler-Natta catalyst system (e.g., catalyst, activator and/or electron donors) mayor may not be associated with a support, either in combination with each other or separate from one another. The Z-N support materials may include a magnesium dihalide, such as magnesium dichloride or magnesium dibromide, or silica, for example.

Prior efforts to form the Ziegler-Natta catalyst generally included the methods described below. (See, U.S. Pat. No. 6,734,134 and U.S. Pat. No. 6,174,971, which are incorporated by reference herein.)

A representative, non-limiting, illustration of a possible reaction scheme may be illustrated as follows:

$$MgR^3R^4 + 2R^5OH \rightarrow Mg(OR^6)_2 \quad 1)$$

$$MG(OR^6)_2 + ClA(O_xR^7)_y \rightarrow \text{``A}^1\text{''} \quad 2)$$

$$\text{``A}^1\text{''} + TiCl_4/Ti(OR^8)_4 \rightarrow \text{``A}^2\text{''} \quad 3)$$

$$\text{``A}^2\text{''} + TiCl_4 \rightarrow \text{``B''} \quad 4)$$

$$\text{``B''} + TiCl_4 \rightarrow \text{``C''} \quad 5)$$

$$\text{``C''} + AR^9_3 \rightarrow \text{Catalyst} \quad 6)$$

Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the components described herein may be added in combination with one another so long as the order of addition complies with the spirit of the invention.

Prior methods generally included contacting an alkyl magnesium compound with an alcohol to form a magnesium dialkoxide compound. The alkyl magnesium compound was generally represented by the following formula (I):

$$MgR^3R^4; \quad (I)$$

wherein $R^3$ and $R^4$ were independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol was generally represented by the formula (II):

$$R^5OH; \quad (II)$$

wherein $R^5$ was selected from $C_2$ to $C_{20}$ linear or branched alkyl groups. Non-limiting illustrations of alcohols generally include butanol, isobutanol and 2-ethylhexanol, for example.

Prior methods then included contacting the magnesium dialkoxide compound with a first agent to form reaction product "$A^1$".

The first agent was generally represented by the following formula (III):

$$ClA(O_xR^7)_y; \quad (III)$$

wherein A was selected from titanium, silicon, aluminum, carbon, tin and germanium, $R^7$ was selected from $C_1$ to $C_{10}$ linear or branched alkyls, such as methyl, ethyl, propyl and isopropyl, x was 0 or 1 and y was the valence of A minus 1. Non-limiting illustrations of first agents include chlorotitaniumtriisopropoxide $ClTi(O^iPr)_3$ and $ClSi(Me)_3$, for example.

Prior methods further included contacting reaction product "$A^1$" with a second agent to form reaction product "$A^2$". The second agent was generally represented by the following formula (IV):

$$TiCl_4/Ti(OR^8)_4; \quad (IV)$$

wherein $R^8$ was selected from $C_2$ to $C_{20}$ alkyl groups. Non-limiting illustrations of second agents include blends of titanium chloride and titanium alkoxides, such as $TiCl_4/Ti(OBu)_4$.

As illustrated above, the first agent and the second agent generally include blends of compounds. Unfortunately, such blends are specialty chemicals having a high production cost.

Therefore, one or more embodiments of the invention (either alone or in combination) generally include modifying/removing the blended agents to reduce the production cost, while retaining one or more of the beneficial properties obtained via blends.

Further, many of the alkyl magnesium compounds utilized to form Ziegler-Natta catalysts, and in particular, butylethyl magnesium, are high cost materials. Therefore, one or more embodiments may include modifying and/or replacing the alkyl magnesium compound.

In particular, embodiments of the invention generally include providing a first compound comprising a magnesium dialkoxide. In one or more specific embodiments, the magnesium dialkoxide is magnesium ethoxide ($Mg(OEt)_2$).

The magnesium dialkoxide is then contacted with a second compound to form a solution of reaction product "A". Such embodiments generally are capable of forming reaction product "A" from the first compound and the second compound in a single process step.

Unlike prior methods discussed herein, the second compound is generally represented by the formula (V):

$$Ti(OR^1)_4; \qquad (V)$$

wherein $R^1$ is selected from $C_1$ to $C_{10}$ linear to branched alkyls. In one or more specific embodiments, the second compound is selected from titanium 2-ethylhexyl alkoxide, titanium n-butoxide and combinations thereof, for example.

The first compound may contact the second compound at a temperature of from about room temperature to about 200° C., for example. In addition, the first compound may contact the second compound in an equivalent of from about 0.75 to about 1.75, for example.

Optionally, the first compound may contact a third compound in the presence of the second compound. The third compound is generally represented by the formula (VI):

$$Al(OR^2)_3; \qquad (VI)$$

wherein $R_2$ is selected from $C_1$ to $C_{10}$ linear to branched alkyls. In one or more specific embodiments, the third compound is aluminum 2-ethylhexyl alkoxide.

The first compound may contact the third compound at a temperature of from about room temperature to about 200° C., for example. In addition, the first compound may contact the third compound in an equivalent of from about 0.10 to about 0.5, for example.

In one or more embodiments, the second compound and the third compound contact one another prior to contact with the first compound. In addition, the second compound may contact the third compound in an equivalent of from about 0.10 to about 0.5, for example.

Embodiments of the present invention further include contacting reaction product "A" with a first metal halide to form a solid reaction product "B".

Such reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at room temperature, for example.

Non-limiting illustrations of first metal halides may include any metal halide known to one skilled in the art, such as titanium tetrachloride ($TiCl_4$), for example. The third agent may be added in a equivalent of from about 0.1 to about 5, or from about 0.25 to about 4 or from about 0.45 to about 2.5, for example.

The method may further include contacting reaction product "B" with a second metal halide to form reaction product "C".

Such reaction may occur in the presence of an inert solvent. The inert solvents may include any of those solvents previously discussed herein, for example.

The reaction may further occur at room temperature, for example.

The second metal halide may be added to the reaction product "B" in an equivalent of from about 0.1 to about 5, or from about 0.25 to about 4 or from about 0.45 to about 2.0, for example. Moreover, the second metal halide may be added in a stepwise fashion, which is to add one half first, then after washing, the second half is introduced in order to affect the catalyst performance.

Non-limiting illustrations of second metal halides may include any metal halide previously described herein.

The method may then include contacting reaction product "C" with a reducing agent to form the catalyst component. The reducing agent may be selected from organolithium compounds, organomagnesium compounds, organoaluminum compounds and combinations thereof, for example.

The reducing agent may be added to the reaction product "C" in an equivalent of from about 0.1 to about 1.0 or from 0.1 to about 0.5, for example.

Non-limiting illustrations of reducing agents include organoaluminum compounds. The organoaluminum compounds may include aluminum alkyls having the following formula (VII);

$$AlR^9_3; \qquad (VII)$$

wherein $R^9$ is a $C_1$ to $C_{10}$ alkyl compound. Non-limiting illustrations of the aluminum alkyl compounds generally include trimethyl alumimum (TMA), triisobutyl aluminum (TIBAl), triethyl aluminum (TEAl), n-octyl aluminum and n-hexyl aluminum, for example.

Upon formation, the catalyst may optionally be subjected to heat treating. Such heat treating generally includes heating the catalyst to a temperature in the range of from about 40° C. to about 150° C., or from about 90° C. to about 125° C. or from about 40° C. to about 60° C., for example. Such heat treatment may occur for a time of from about 0.5 hours to about 24 hours or from about 1 hour to about 4 hours, for example.

In one or more embodiments, the catalyst has a volume average particle size of at least about 5 microns. Further, the catalyst of the inventive embodiments unexpectedly exhibits a volume average particle size that is greater than a volume average particle size of the catalyst absent contact with the third compound.

In one or more embodiments, the catalyst may exhibit bimodal particle size distributions. For example, a single catalyst including a plurality of particle size peaks is considered to be "bimodal".

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed.

Such processes may include solution phase, gas phase, slurry phase, bulk phase, high pressure processes or combinations thereof, for example. (See, U.S. Pat. No. 5,525,678: U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. % or at least about 90 wt. % polyethylene relative to the total weight of polymer, for example.

The ethylene based polymers may have a density (as measured by ASTM D-792) of from about 0.86 g/cc to about 0.98 g/cc, or from about 0.88 g/cc to about 0.965 g/cc, or from about 0.90 g/cc to about 0.965 g/cc or from about 0.925 g/cc to about 0.97 g/cc, for example.

The ethylene based polymers may have a melt index ($MI_2$) (as measured by ASTM D-1238) of from about 0.01 dg/min to about 100 dg/min., or from about 0.01 dg/min. to about 25 dg/min., or from about 0.03 dg/min. to about 15 dg/min. or from about 0.05 dg/min. to about 10 dg/min, for example.

In one or more embodiments, the polymers include low density polyethylene.

In one or more embodiments, the polymers include linear low density polyethylene.

In one or more embodiments, the polymers include medium density polyethylene. As used herein, the term "medium density polyethylene" refers to ethylene based polymers having a density of from about 0.92 g/cc to about 0.94 g/cc or from about 0.926 g/cc to about 0.94 g/cc, for example.

In one or more embodiments, the polymers include high density polyethylene. As used herein, the term "high density polyethylene" refers to ethylene based polymers having a density of from about 0.94 g/cc to about 0.97 g/cc, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

EXAMPLES

In the following examples, Al(O-2-ethylhexyl)$_3$ was prepared in situ by the reaction of Triethyl aluminum (TEAl) and 2-ethylhexanol. Catalysts were prepared in a 500 mL reactor equipped with four Morten's indentions and a dropping funnel, three blade agitator and septa.

Table 1 below illustrates catalyst synthesis conditions. Catalysts 1, 2 and 3 were prepared by using Ti(OBu)$_4$ (TNBT), while catalysts 4 and 5 were made by Ti(O-2-ethylhexyl)$_4$.

TABLE 1

| Catalyst | Ti(OR)$_4$ | Ti(OR)$_4$/Mg | Al(O-2-ethylhexyl)$_3$/Mg |
|---|---|---|---|
| 1 | TNBT | 0.75 | None |
| 2 | TNBT | 1.25 | None |
| 3 | TNBT | 1.75 | None |
| 4 | Ti(O-2-ethylhexyl)$_4$ | 1.5 | None |
| 5 | Ti(O-2-ethylhexyl)$_4$ | 1.5 | 0.3 |

Figure 2:
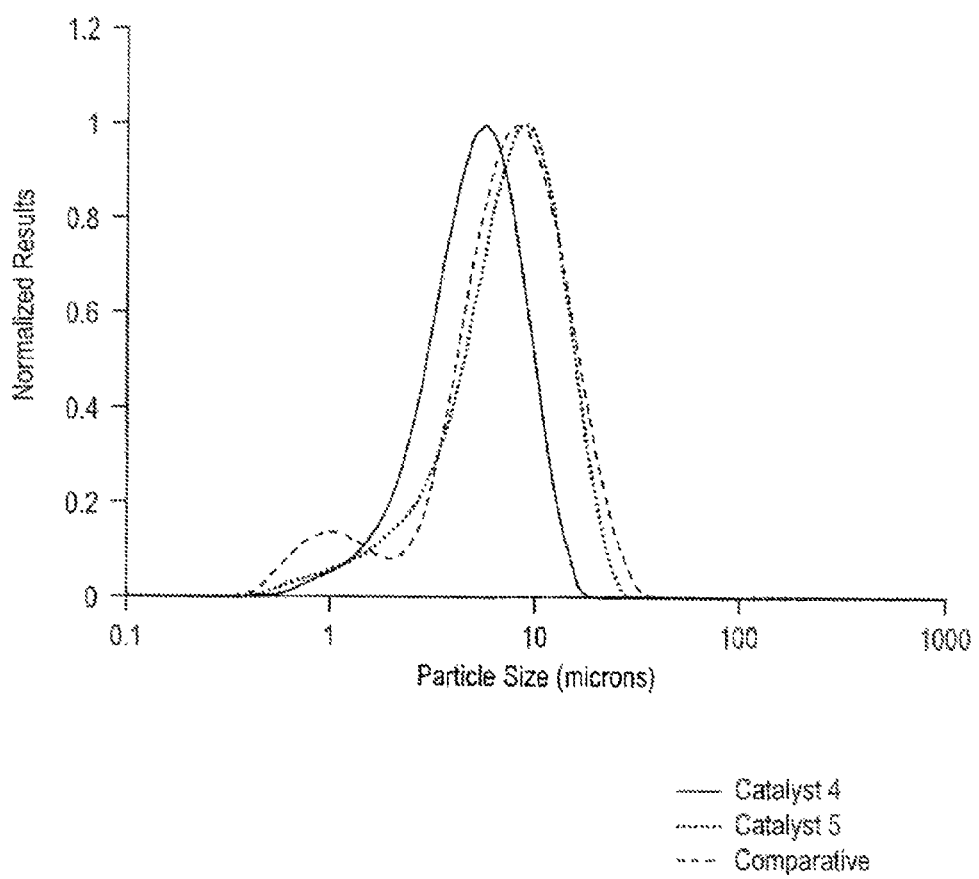

The volume average particle size distributions of the formed catalyst are shown in FIGS. 1 and 2. As shown, the relative amounts of TNBT appear to impact catalyst morphology. It was observed that the volume average particle size distribution was very broad to bimodal. However, it appears as if the type of Ti alkoxide reagent has the biggest impact on the volume average particle size distribution under the conditions employed for the precipitation. The use of titanium 2-ethylhexyl alkoxide (catalyst 4) provides a morphology similar to (but somewhat smaller than) that of prior formed catalyst.

While the foregoing is directed to embodiments of the present invention, other and further embodiments of the invention may be devised without departing from the basic scope thereof and the scope thereof is determined by the claims that follow.

What is claimed is:

1. A process of forming a catalyst system comprising:
   providing a magnesium dialkoxide as a first compound;
   contacting the magnesium dialkoxide with a third compound in the presence of a second compound to form a solution of reaction product "A", wherein the second compound is TNBT or Ti(O-2-ethylhexyl)$_4$, and the third compound is generally represented by the formula:

Al(OR$^2$)$_3$ wherein R$^2$ is selected from C$_1$ to C$_{10}$ linear or branched alkyls
   contacting the solution of reaction product "A" with a first metal halide to form a solid reaction product "B";
   contacting solid reaction product "B" with a second metal halide to form reaction product "C"; and
   contacting reaction product "C" with a reducing agent to form a catalyst component, wherein the reducing agent is selected from the group consisting of trimethyl aluminum, triisobutyl aluminum, triethyl aluminum, n-octyl aluminum and n-hexyl aluminum.

2. The process of claim 1, wherein the magnesium dialkoxide is represented by the formula Mg(OEt)$_2$.

3. The process of claim 1, wherein the magnesium dialkoxide contacts the second compound in an equivalent of from about 0.75 to about 1.75.

4. The process of claim 1, wherein the third compound comprises aluminum 2-ethylhexanoxide.

5. The process of claim 1, wherein the second compound and the third compound contact one another prior to contact with the magnesium dialkoxide.

6. The process of claim 1, wherein the first metal halide and the second metal halide each comprise TiCl$_4$.

7. A Ziegler-Natta catalyst formed from the process of claim 1.

8. The catalyst of claim 7 further comprising a particle size of at least about 5 microns.

9. The catalyst of claim 7, wherein the catalyst exhibits a particle size that is greater than a particle size of the catalyst absent contact with the third compound.

10. A polymerization process comprising:
    introducing an olefin monomer into a reaction zone;
    contacting the olefin monomer with the catalyst of claim 1 to form a polyolefin; and
    withdrawing the polyolefin from the reaction zone.

11. The process of claim 1, wherein the reaction product "A" is formed from the second compound and the magnesium dialkoxide in a single process step.

* * * * *